(12) United States Patent
Tachibana et al.

(10) Patent No.: US 6,317,988 B1
(45) Date of Patent: Nov. 20, 2001

(54) SABER SAW HAVING SHOE TO BE PRESSED AGAINST WORKPIECE

(75) Inventors: Toshihiko Tachibana; Yoshio Osada, both of Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 09/635,403

(22) Filed: Aug. 10, 2000

(30) Foreign Application Priority Data

Aug. 11, 1999 (JP) .................................................. 11-227807

(51) Int. Cl.$^7$ ........................................................ B27B 11/02
(52) U.S. Cl. .................................. 30/376; 30/374; 30/392
(58) Field of Search .............................. 30/371, 376, 377, 30/392, 393, 374, 375

(56) References Cited

U.S. PATENT DOCUMENTS

| 2,998,830 | * | 9/1961 | Atkinson | 30/376 |
| 5,007,172 | | 4/1991 | Palm | 30/377 |
| 5,134,777 | * | 8/1992 | Meyer et al. | 30/392 |
| 5,421,091 | | 6/1995 | Gerritsen et al. | 30/377 |
| 5,724,741 | | 3/1998 | Bednar | 30/376 |
| 5,855,070 | * | 1/1999 | Grabowski | 30/376 |
| 6,234,255 | * | 5/2001 | Feldmann et al. | 30/393 |
| 6,249,979 | * | 6/2001 | Bednar et al. | 30/392 |

\* cited by examiner

*Primary Examiner*—Hwei-Siu Payer
(74) *Attorney, Agent, or Firm*—Sughrue, Mion, Zinn, Macpeak & Seas, PLLC

(57) ABSTRACT

A saber saw having a shoe pressing against a workpiece for holding an entire device at its given position during cutting operation. A saw blade extends from a main body and is reciprocally moveable in the extending direction. The shoe is pivotally supported to a shoe support member detachably fixed to a shoe adapter movably held in the main body. A torsion spring is interposed between the shoe and the shoe support member for urging an upper portion of the shoe toward the main body. The rear end of the shoe adapter is provided with a rubber damper in pressure contact with the main body.

10 Claims, 7 Drawing Sheets

SABER SAW HAVING SHOE TO BE PRESSED AGAINST WORKPIECE

BACKGROUND OF THE INVENTION

The present invention relates to a saber saw or a reciprocating saw for cutting a workpiece such as woods, steel rods, and pipes etc. for building, remodeling and pulling down houses, equipment and buildings, and more particularly, to a shoe mechanism of the saber saw including a shoe to be pressed against the workpiece by an operator.

Conventionally in a saber saw shown in FIG. 1, a linear saw blade 5 is connected to a reciprocating shaft or a plunger (not shown) driven by an electric motor (not shown), so that the saw blade 5 is reciprocally moved for cutting a workpiece 10. During cutting operation using the saber saw, reaction force is exerted in the reciprocating direction of the saw blade 5. In order to withstand the reaction force, a shoe 3 is pushed onto a workpiece 10 as shown in FIG. 1 during cutting operation to hold the entire device at a given position or posture. The shoe 3 is provided to a front end of a shoe support member or a post 2 attached to a main body 1 of the saber saw. The shoe 3 extends in a direction approximately perpendicular to the reciprocating direction. Further, the shoe 3 is pivotally movably supported to the post 2 by a pivot shaft 6 for facilitating a stable posture of the main body 1 relative to a workpiece 10. The shoe 3 is formed with a vertical slot through which the saw blade 5 extends.

By pushing the shoe 3 onto the workpiece 10, the positional relationship between the workpiece 10 and the saw blade 5 can be maintained constantly, and the reactive force generated in the reciprocating direction of the saw blade 5 can be received on the shoe 3 in order to enhance workability. Such arrangement is described in U.S. Pat. Nos. 5,007,172, 5,421,091 and 5,724,741.

However, in such conventional arrangement, the shoe 3 impacts or bumps on the workpiece 10 each time the saw blade 5 reciprocates to generate vibration and noise, which lower workability and increase operator's sense of fatigue.

Further, since the shoe 3 is pivotally supported to the post 2, there may be a posture of the shoe 3 as shown in FIG. 2, where a portion of the shoe 3 lower than the pivot shaft 6 is in abutment with the workpiece 10. In this case, a remaining portion of the shoe 3 higher than the pivot shaft 6 is inclined over the workpiece 10. Thus, it would be difficult to observe the actual cutting position of the saw blade 5, since the upper portion of the shoe 3 becomes an obstacle against the operator's view line. Incidentally, FIG. 3 shows other angular posture of the shoe 3 in which a portion of the shoe 3 higher than the pivot shaft 6 is in abutment with the workpiece 10. In the latter case, the actual cutting position is visible without any obstruction by the shoe 3.

SUMMARY OF THE INVENTION

It is therefore an object of the present invention to provide a saber saw capable of moderating reciprocating reaction force and providing a clear open space for facilitating observation of actual cutting position of the saw blade.

These and other objects of the present invention will be attained by an improved shoe mechanism of a saber saw, the saber saw including a main body having a front end, and a saw blade extending in a frontward/rearward direction of the main body and projecting from the front end of the main body. The saw blade is reciprocally movable in the frontward/rearward direction. The shoe mechanism includes a shoe support member, a pivot shaft, a shoe, and an urging member. The shoe support member is attached to the main body and extends in the frontward/rearward direction and projects from the front end of the main body. The pivot shaft is provided to the front end of the shoe support member. The shoe is pivotally supported to a front end of the shoe support member by the pivot shaft and has a front end surface abuttable on a workpiece. The shoe has an upper portion above the pivot shaft and a lower portion below the pivot shaft. The urging member is provided in association with the shoe support member and the shoe for urging the upper portion of the shoe toward the main body. Thus the urging member provides a clear open space for allowing the operator to easily observe the actual cutting position, because the upper portion of the shoe is positioned away from the operator's view line. Further, the urging member can serve as a damper for moderating vibration imparted on the shoe. Thus, the operator can easily hold the main body.

DETAILED DESCRIPTION OF THE PREFERRED EMBODIMENTS

Figure 1:
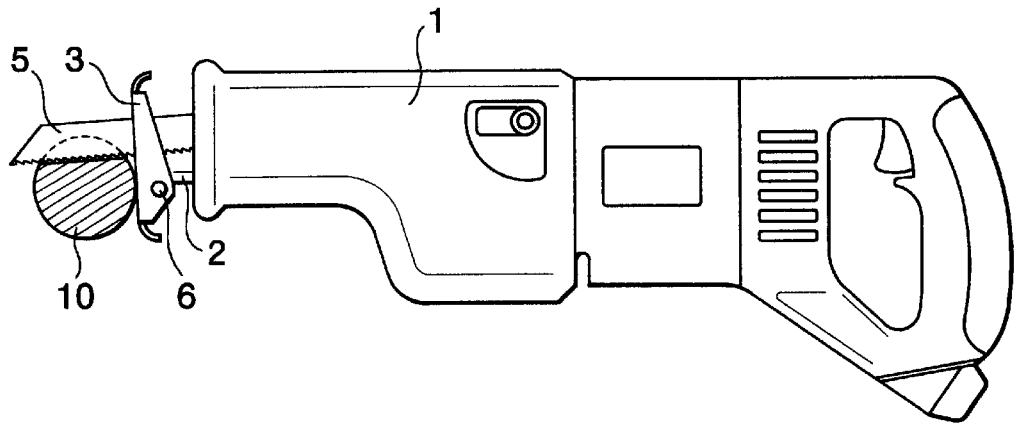
FIG. 1 is a side view showing a conventional saber saw.
Figure 2:
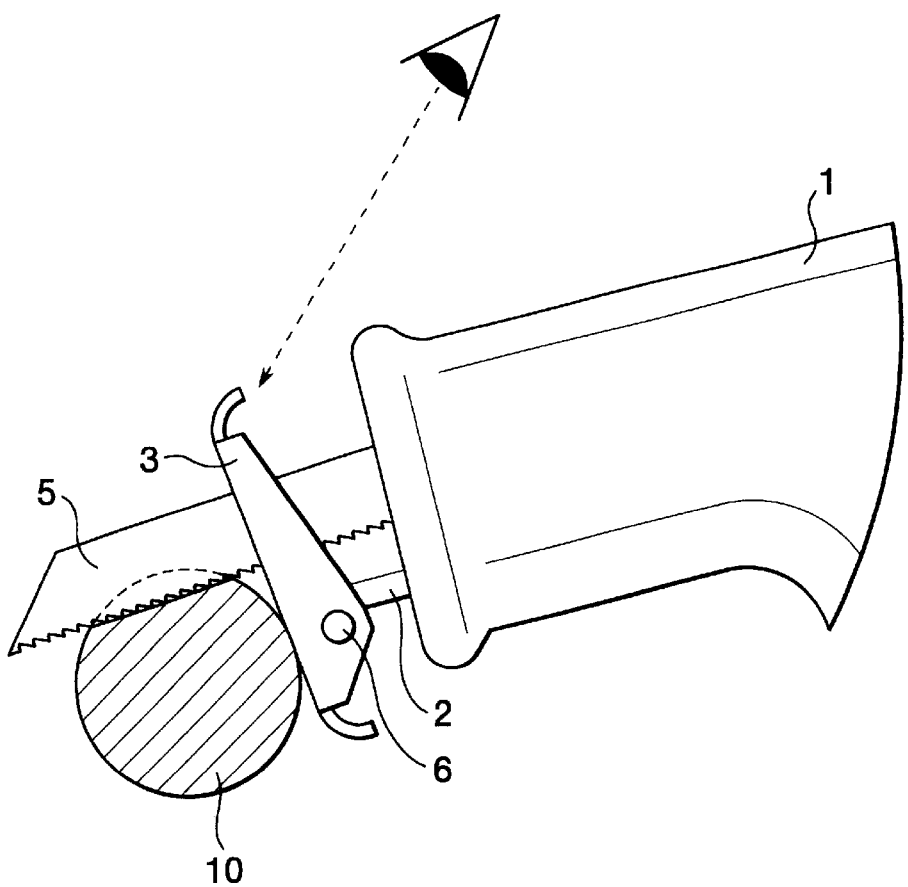
FIG. 2 is a view for description of a cutting phase in the conventional saber saw.
Figure 3:
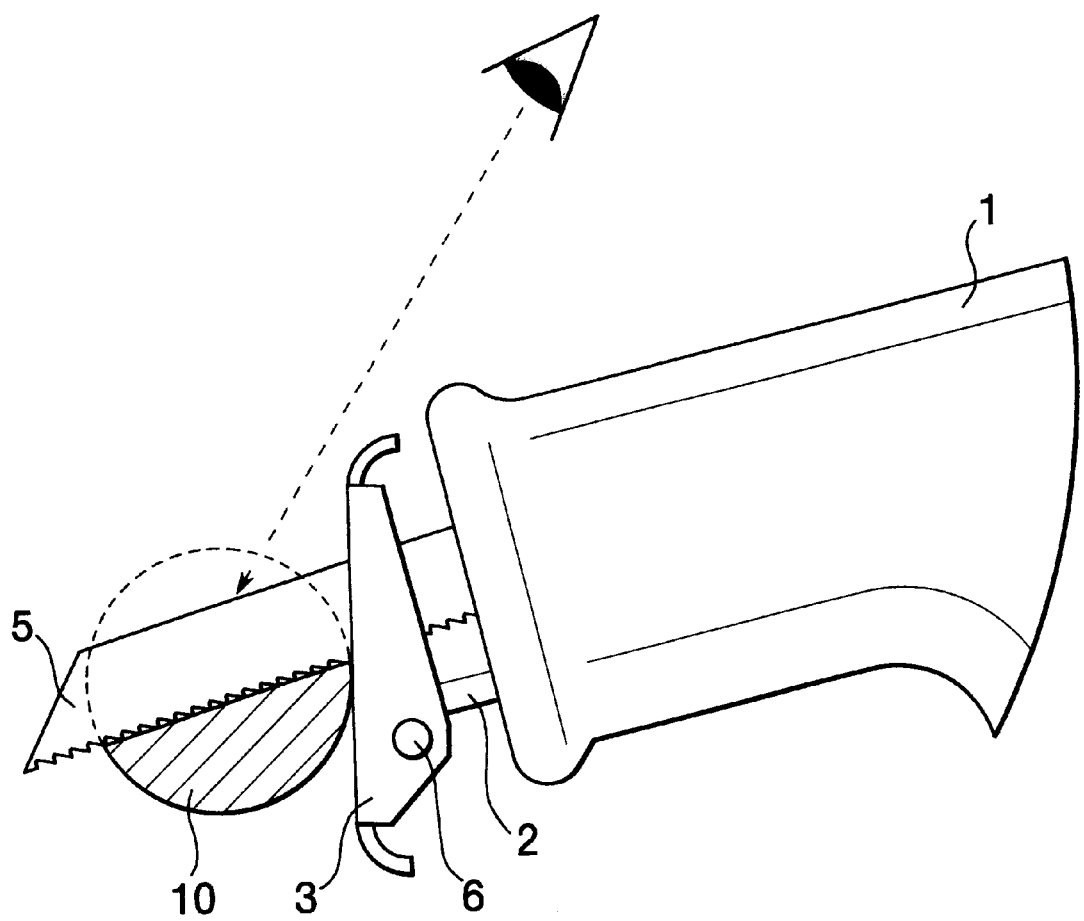
FIG. 3 is a view for description of other cutting phase in the conventional saber saw.

A saber saw including a shoe mechanism according to one embodiment of the present invention will be described with reference to FIGS. 4 through 12, wherein like parts and components are designated by the same reference numerals as those shown in FIGS. 1 through 3. Throughout the specification, "front" and "rear" imply sides of a saw blade and a main body, respectively.

Figure 6:
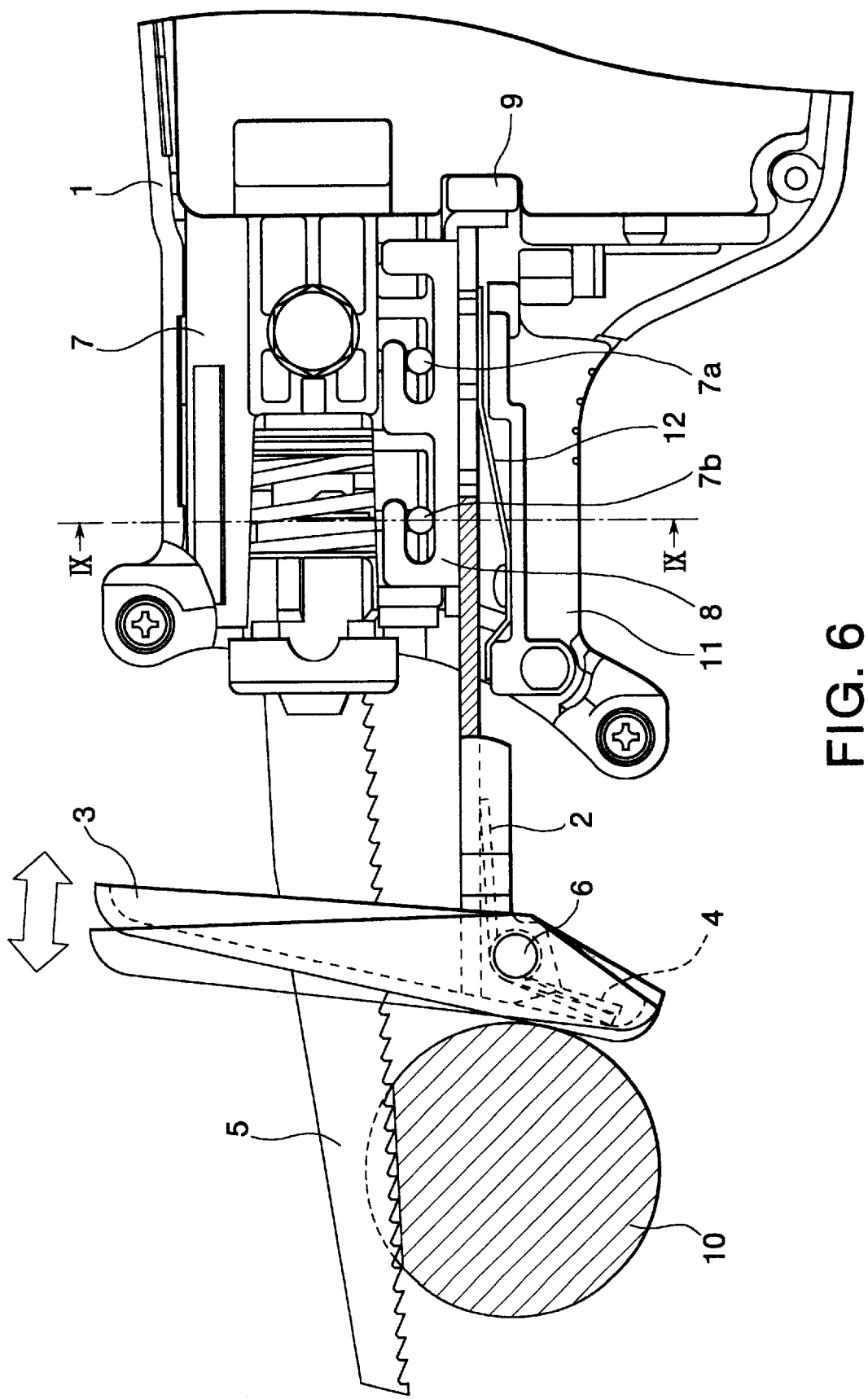
FIG. 6 is a side view showing the saber saw according one embodiment of the present invention.

As shown in FIG. 6, the saber saw includes a main body 1 provided with a gear cover 7. A plunger is reciprocally movably provided in the gear cover 7. A linear saw blade 5 is fixed to the plunger. The saw blade 5 extends in a frontward/rearward direction of the main body 1 and projects from the front end of the main body 1. The saw blade 5 is reciprocally movable in the frontward/rearward direction. The gear cover 7 is provided with transversely extending two pairs of projections 7a and 7b. Upon actuation of the plunger, the saw blade 5 is reciprocally moved.

Figure 7:
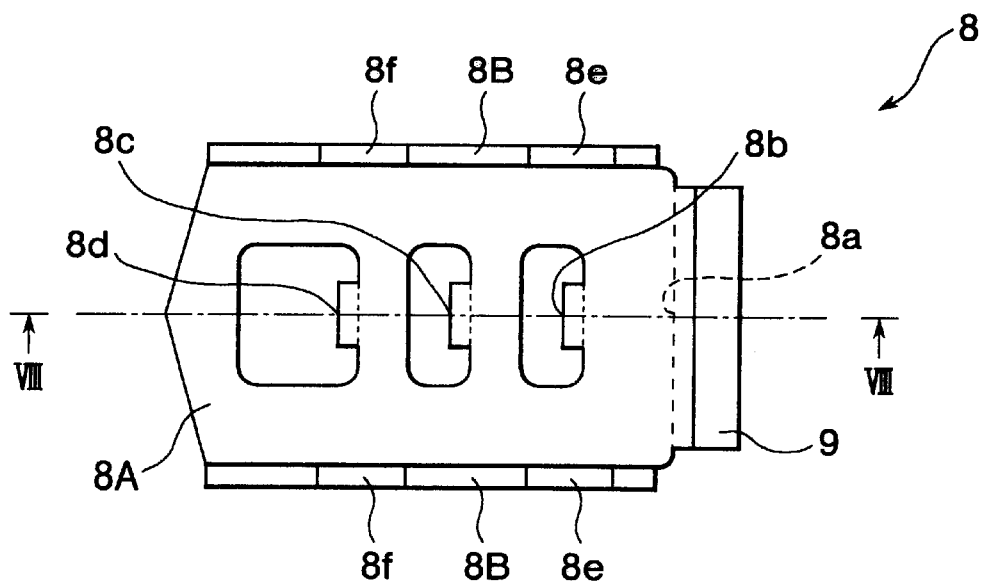
FIG. 7 is a plan view showing a shoe adapter and a resilient member (damper), those constituting the shoe mechanism according to the invention.
Figure 8:
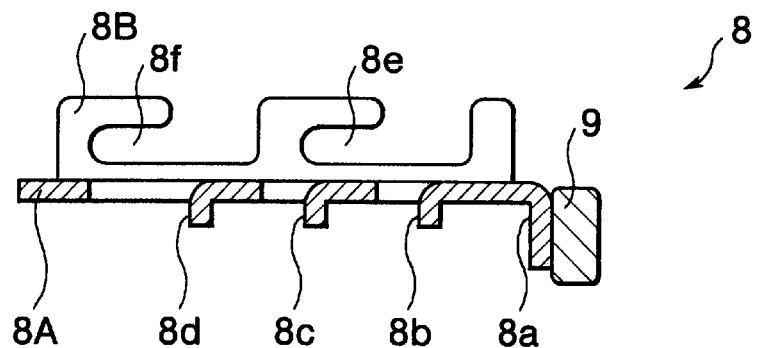
FIG. 8 is a cross-sectional view taken along the line VIII—VIII of FIG. 7.
Figure 9:
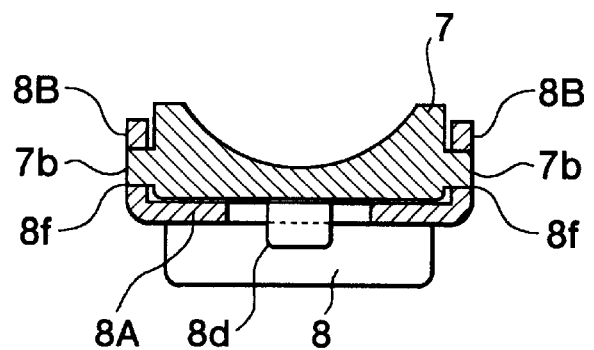
FIG. 9 is a cross-sectional view taken along the line IX—IX of FIG. 6.

A shoe adapter 8 is connected to the gear cover 7 through the projections 7a and 7b. As shown in FIGS. 7 and 8, the shoe adapter 8 includes a base 8A and upstanding side walls 8B, 8B. The base 8A has a rearmost bent 8a and downwardly projecting engagement segments 8b, 8c and 8d, those arrayed in the reciprocating direction of the saw blade 5. A damper 9 made of a resilient material such as a rubber is attached to the rearmost bent 8a. The damper 9 is in contact with the gear cover 7. Each upstanding side wall 8B is formed with horizontally extending slots 8f and 8e. A rear upper portion of each slot is open as best shown in FIG. 8. As shown in FIGS. 6 and 9, the shoe adapter 8 can be attached to the gear cover 7 by engaging the two pairs of projections 7a, 7b with the slots 8e, 8f. Thus, the shoe adapter 8 is slidable with respect to the gear cover 7 in the reciprocating direction of the saw blade 5 within a predetermined stroke defined by a length of the slots 8e, 8f.

Figure 4:
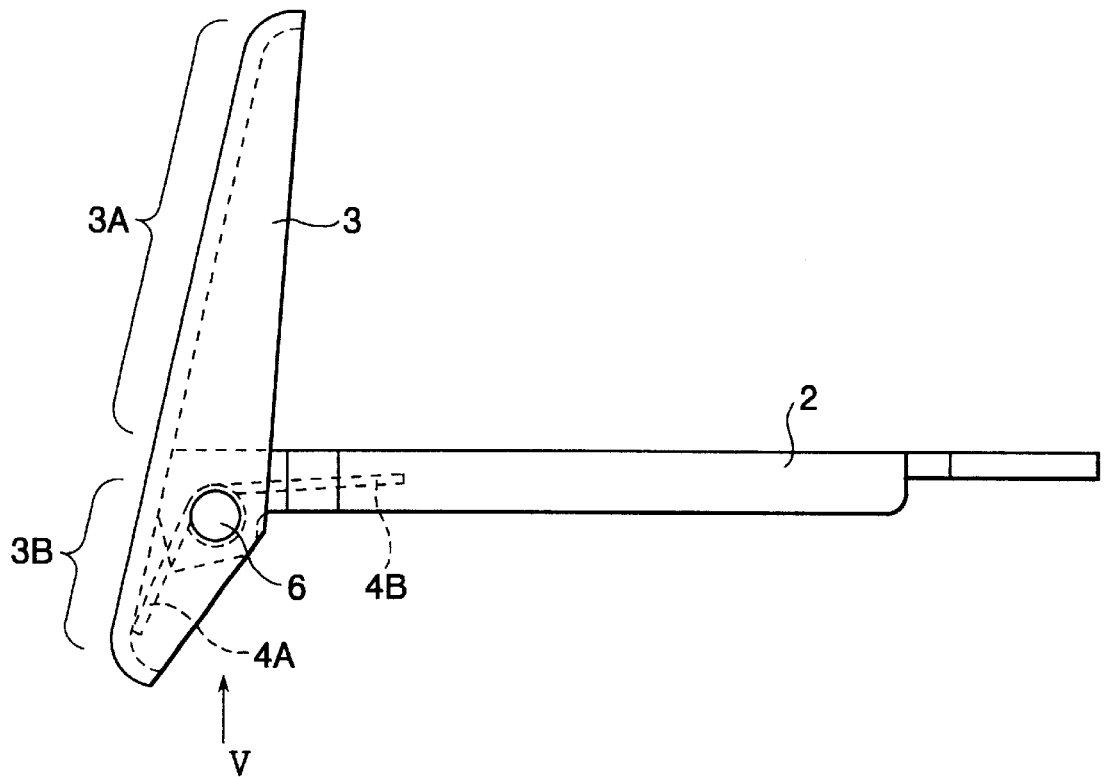
FIG. 4 is a side view showing a shoe mechanism including a shoe, a shoe post and a torsion spring in a saber saw according to one embodiment of the present invention.
Figure 5:
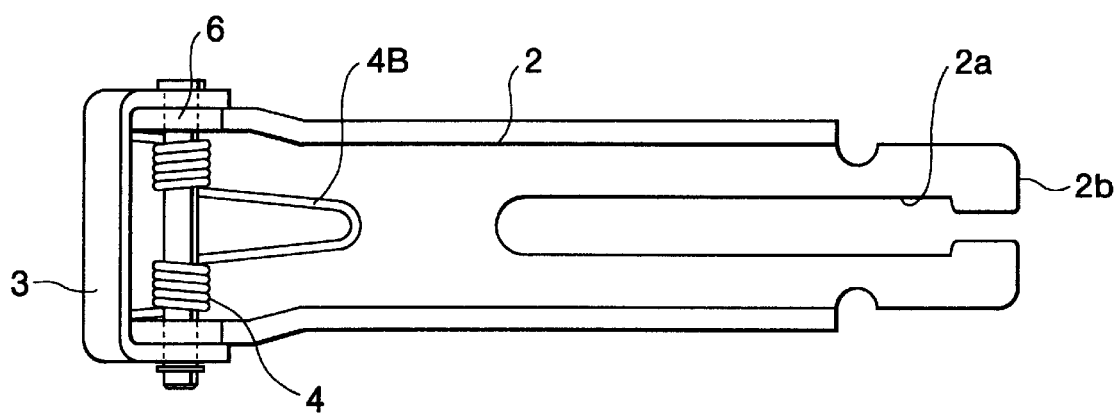
FIG. 5 is a bottom view as viewed from an arrow V of FIG. 4.

A shoe 3 is pivotally connected to a shoe support member or a post 2 by a pivot pin 6, and a torsion spring 4 is interposed between the shoe 3 and the post 2. More specifically, as shown in FIG. 4, the shoe 3 has a major upper portion 3A positioned above the pivot shaft 6, and a minor lower portion 3B positioned below the pivot shaft 6. The torsion spring 4 is wound over the pivot shaft 6, and has one spring arm 4A in contact with a rear surface of the minor lower portion 3B of the shoe 3 and another spring arm 4B in contact with a lower surface of the post 2 as shown in FIG. 5. Thus, the major upper portion 3A of the shoe 3 is normally urged toward the main body 1 by the torsion spring 4. The shoe 3 is formed with a slot through which the saw blade 5 reciprocally moves in the conventional manner.

The post 2 has a rear portion positioned in the gear cover 7 and detachably fixed to the shoe adapter 8. The post has an engagement bore 2a selectively engageable with at least one of the projecting engagement segments 8b, 8c and 8d of the shoe adapter 8. The post 2 has a rearmost end face 2b selectively abuttable on a vertical surface of one of the engaging segments 8b, 8c and the rear bend end 8a. Thus, the projecting length of the post 2 from the front end of the main body 1 can be selectively controlled.

A lever 11 is pivotally movably supported to the gear cover 7, and a leaf spring 12 is attached on the lever 11 for pushing the rear end portion of the post 2 toward the shoe adapter 8. The lever 11 can provide a fixing position shown in FIG. 6 where the post 2 is stably fixed to the shoe adapter 8 by means of the leaf spring 12, and a release position show in FIG. 12 where the urging force of the leaf spring 12 toward the shoe adapter 8 is reduced for facilitating detachment of the post 2 from the shoe adapter 8.

Figure 10:
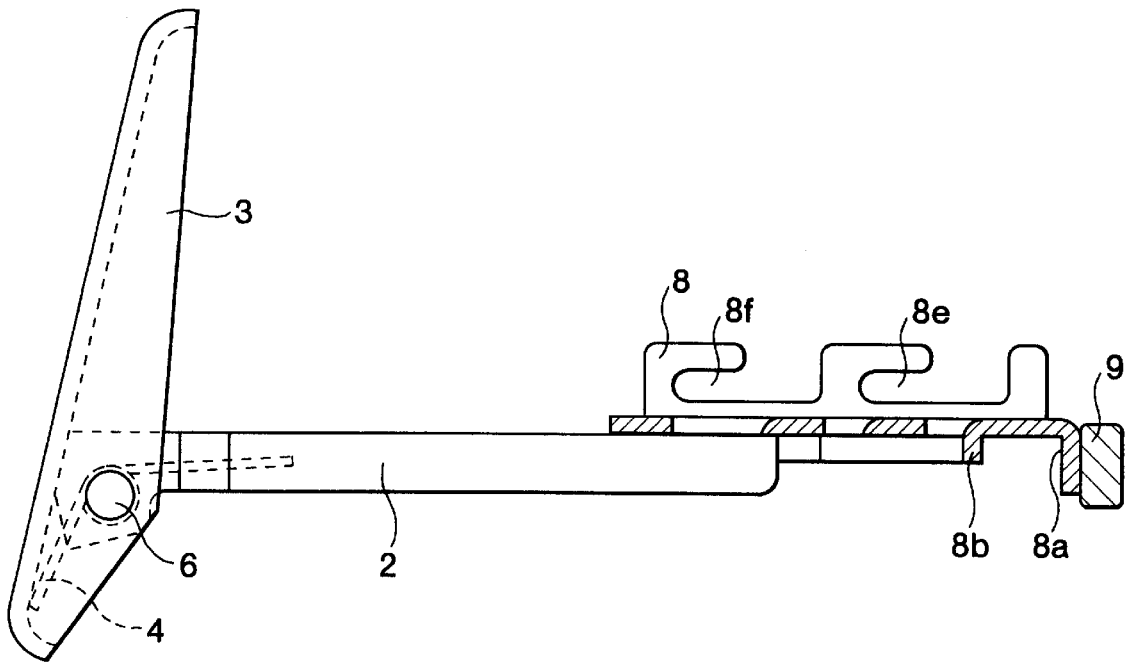
FIG. 10 is a partially cross-sectional side view showing the shoe, the shoe post and the shoe adapter those constituting the shoe mechanism according to the present invention.
Figure 11:
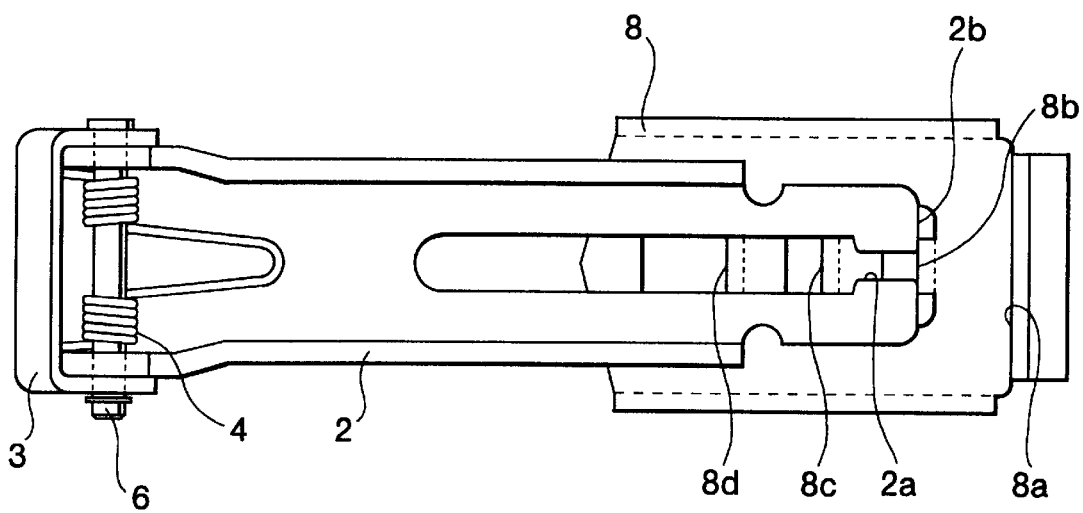
FIG. 11 is a bottom view of the shoe mechanism shown in FIG. 10.
Figure 12:
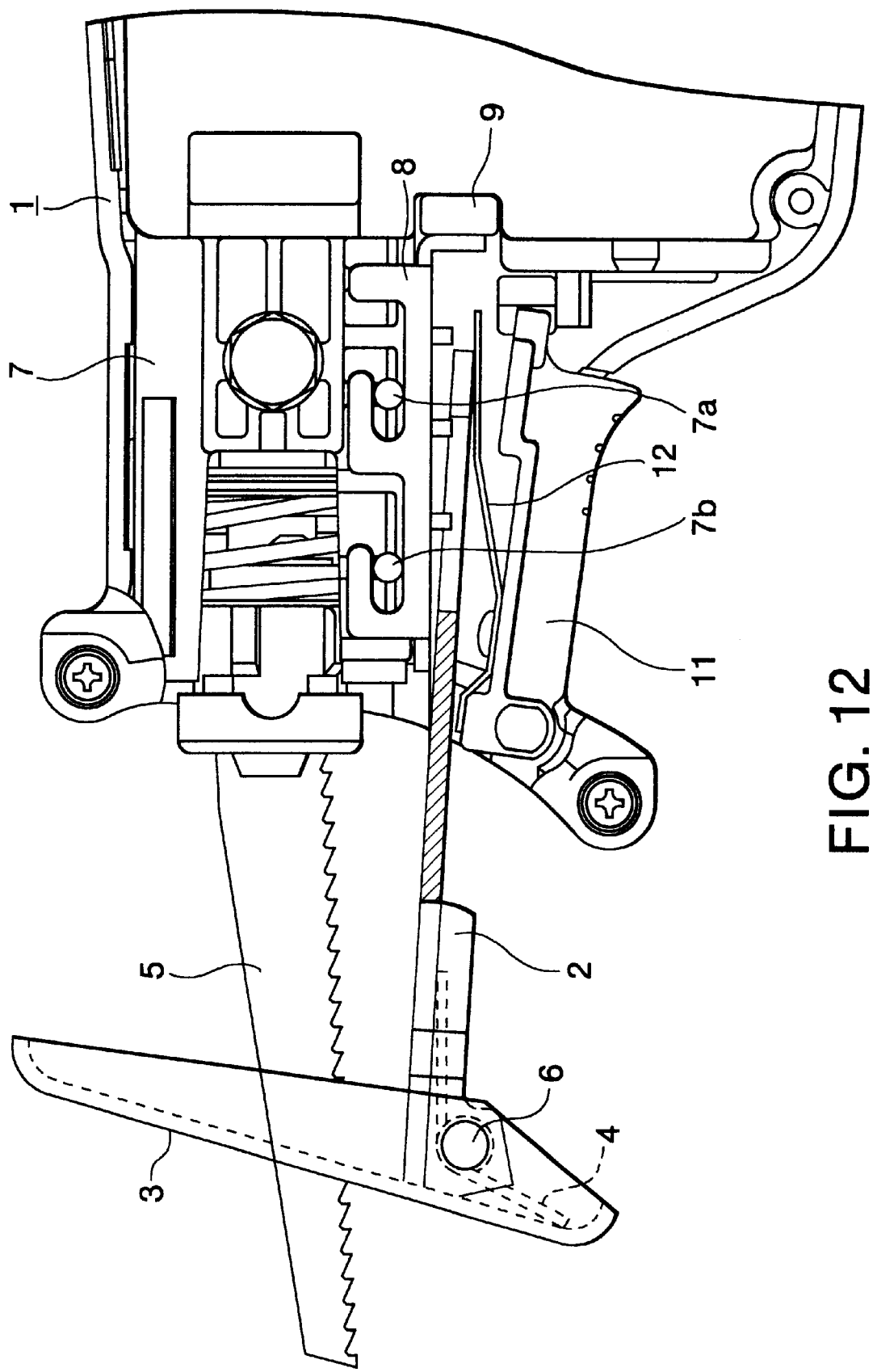
FIG. 12 is a side view showing the saber saw according to the embodiment and showing a state where a shoe lever is shifted downward.

In the state shown in FIGS. 10 and 11, the rearmost end face 2b is in abutment with the vertical surface of the engaging segment 8b, and the engagement bore 2a is in engagement with the engagement segments 8c and 8d. Thus, the projecting length of the post 2 from the main body 1 may be as shown in FIG. 12. On the other hand, in the state shown in FIG. 6, the rearmost end face 2b is in abutment with the vertical surface of the rear bend end 8a, and the engagement bore 2a is in engagement with the engagement segments 8b, 8c and 8d. Thus, the projecting length of the post 2 from the main body 1 is smaller than that shown in FIG. 12.

If the projecting length is to be changed, the lever 11 is pivotally moved to its release position shown in FIG. 12, and the engagement fashion between the post 2 and the shoe adapter 8 can be changed. By changing the projecting length, an actual cutting area of the saw blade 5 acting on the workpiece 10 can be changed, so that a local wear of the saw blade 5 can be avoided.

During cutting operation, the front surface of the shoe 3 is in abutment with the workpiece 10. Even if the minor lower portion 3B of the shoe 3 is in abutment with the workpiece 10 as shown in FIG. 6, the shoe 3 does not become an obstacle for observing the actual cutting position by an operator, because the major upper portion 3A of the shoe 3 is urged toward the main body 1 by the torsion spring 4. Further, the torsion spring 4 can serve as a damper for moderating or damping the repeated bump of the shoe 3 against the workpiece 10 due to reaction force generated by reciprocal cutting. Thus, vibration due to the bump can be reduced, and as a result, desirable working condition can be provided.

Further, the repeated impact due to the bump of the shoe 3 against the workpiece 10 is transmitted to the gear cover 7 through the post 2 and the shoe adapter 8. However, because the damper 9 is positioned between the shoe adapter 8 and the gear cover 7, the damper 9 absorbs the impact force and reduces the vibration. Thus, vibration of the main body 1 can further be reduced. Consequently, cutting work can further be improved because of the damper 9 in addition to the above described torsion spring 4.

While the invention has been described in detail and with reference to the specific embodiments thereof, it would be apparent to those skilled in the art that various changes and modifications may be made therein without departing from the spirit and scope of the invention.

For example, the present invention is available not only for a simple reciprocation type saber saw where the saw blade is only reciprocally movable to move across the workpiece but also for an orbital reciprocation saw as described in U.S. Pat. No. 3,945,120. In the latter type of saw, the saw blade is moved in a orbital locus, that is, the saw blade is pivotally moved in a vertical direction to enhance thrusting or biting force of the saw blade into the workpiece as well as reciprocally moved in the horizontal direction.

What is claimed is:

1. A shoe mechanism of a saber saw, the saber saw including a main body having a front end, and a saw blade extending in a frontward/rearward direction of the main body and projecting from the front end of the main body, the saw blade being reciprocally movable in the frontward/rearward direction, the shoe mechanism comprising:

a shoe support member adapted to be attached to the main body and extending in the frontward/rearward direction and projecting from the front end of the main body, the shoe support member having a front end;

a pivot shaft provided to the front end of the shoe support member;

a shoe pivotally supported to the front end of the shoe support member by the pivot shaft and having a front end surface abuttable on a workpiece, the shoe having an upper portion above the pivot shaft and a lower portion below the pivot shaft; and an urging member provided in association with the shoe support member and the shoe for urging the upper portion of the shoe toward the main body.

2. The shoe mechanism as claimed in claim 1, further comprising means for changing an attachment position of the shoe support member with the main body, so that a projecting length of the shoe support member from the front end of the main body can be changed.

3. The shoe mechanism as claimed in claim 2, further comprising a damper adapted to be in contact with the main body for dampingly supporting the shoe support member to the main body.

4. The shoe mechanism as claimed in claim 2, wherein the changing means comprises a shoe adapter adapted to be attached to the main body and movable in the frontward/rearward direction with respect to the main body, the shoe adapter having a plurality of engagement segments arrayed in the frontward/rearward direction, the shoe support member being in selective engagement with at least one of the plurality of engagement segments.

5. The shoe mechanism as claimed in claim 4, wherein the shoe adapter has a rear end facing the main body, and the shoe mechanism further comprising a damper disposed at the rear end of the shoe adapter and contactable with the main body.

6. The shoe mechanism as claimed in claim 1, wherein the lower portion of the shoe has a rear surface and the shoe support member has a bottom surface;

and wherein the urging member comprises a torsion spring having a central winding portion provided over the pivot shaft, one arm portion extending from the central winding portion and in contact with the rear surface, and another arm portion extending from the central winding portion and in contact with the bottom surface.

7. The shoe mechanism as claimed in claim 6, further comprising means for changing an attachment position of the shoe support member with the main body, so that a projecting length of the shoe support member from the front end of the main body can be changed.

8. The shoe mechanism as claimed in claim 7, further comprising a damper adapted to be in contact with the main body for dampingly supporting the shoe support member to the main body.

9. The shoe mechanism as claimed in claim 7, wherein the changing means comprises a shoe adapter adapted to be attached to the main body and movable in the frontward/rearward direction with respect to the main body, the shoe adapter having a plurality of engagement segments arrayed in the frontward/rearward direction, the shoe support member being in selective engagement with at least one of the plurality of engagement segments.

10. The shoe mechanism as claimed in claim 9, wherein the shoe adapter has a rear end facing the main body, and the shoe mechanism further comprising a damper disposed at the rear end of the shoe adapter and contactable with the main body.

\* \* \* \* \*